Patented Mar. 15, 1932

1,849,834

UNITED STATES PATENT OFFICE

ALPHONS O. JAEGER, OF MOUNT LEBANON, AND LLOYD C. DANIELS, OF CRAFTON, PENNSYLVANIA, ASSIGNORS TO THE SELDEN COMPANY, OF PITTSBURGH, PENNSYLVANIA, A CORPORATION OF DELAWARE

PRODUCTION OF PELARGONIC ALDEHYDE

No Drawing. Application filed May 1, 1929. Serial No. 359,723.

This invention relates to the production of pelargonic aldehyde from salts of sebacic acid.

According to the present invention pelargonic aldehyde is prepared by splitting off a carboxyl group from a salt of sebacic acid in an atmosphere of hydrogen with or without steam. One carboxyl group is split off and the remaining carboxyl groups is reduced to the aldehyde.

Various salts may be used, but the best results are obtained by heating iron, zinc, copper or nickel sebacates to a temperature between 300–450° C. These metals are reduction catalysts and facilitate the reduction. Pelargonic acid together with pelargonic aldehyde may be obtained by heating the alkali or alkaline earth metal salts of sebacic acid in a reducing atmosphere.

The invention will be described in more detail in connection with the following specific example which illustrates one embodiment of the invention.

Example

Zinc sebacate is passed slowly through a 3½ inch reaction tube maintained at about 316° C. in the presence of an atmosphere of hydrogen, the passage taking from one-half hour to an hour. Pelargonic aldehyde distills off admixed with some other impurities and part of the sebacic acid undergoes decomposition there being some formation of carbonaceous material. If steam is added to the hydrogen atmosphere the yields are improved and the amount of decomposition is decreased.

Iron, nickel and copper sebacates give about the same results. Calcium sebacate, or preferably acid calcium sebacate yields a product which contains some pelargonic acid in addition to the pelargonic aldehyde.

What is claimed as new is:
1. A method of producing a product containing pelargonic aldehyde which comprises subjecting a salt of sebacic acid to a temperature between 300–450° C. in the presence of an atmosphere containing hydrogen.
2. A method of producing a product containing pelargonic aldehyde which comprises subjecting a salt of sebacic acid to a temperature between 300–450° C. in the presence of an atmosphere containing hydrogen and steam.

Signed at Pittsburgh, Pennsylvania, this 30th day of April, 1929.

ALPHONS O. JAEGER.
LLOYD C. DANIELS.